March 27, 1951 — H. J. LOVENSTON — 2,546,513
AMPLIFYING GAUGE
Filed May 27, 1944
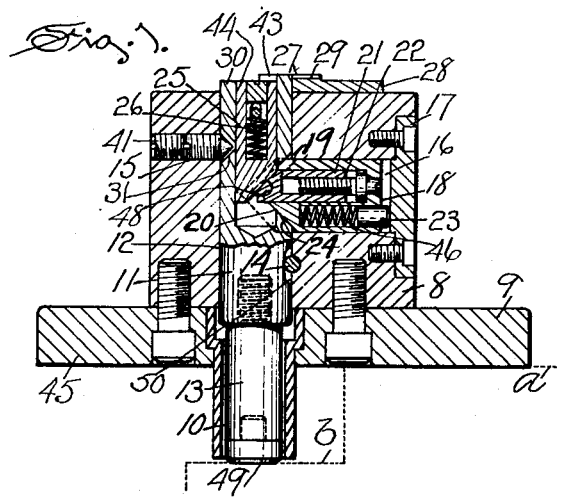
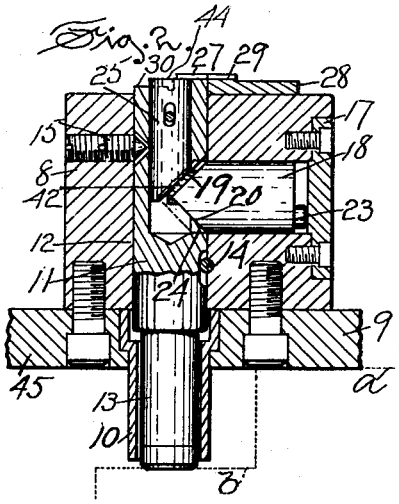
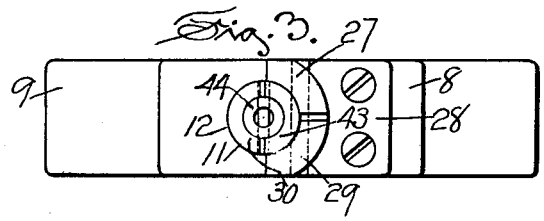
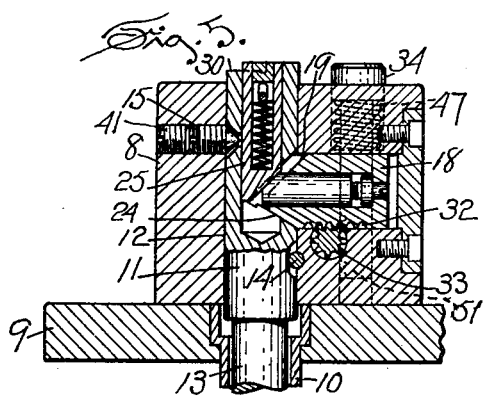
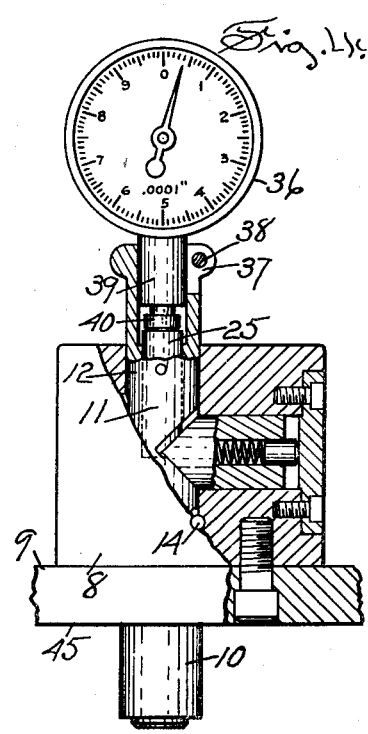
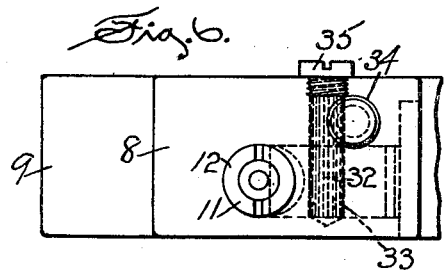
INVENTOR
Hans J. Lovenston
by Arthur B. Jenkins
ATTORNEY Patented Mar. 27, 1951

2,546,513

UNITED STATES PATENT OFFICE 2,546,513

AMPLIFYING GAUGE

Hans J. Lovenston, Detroit, Mich.

Application May 27, 1944, Serial No. 537,699

14 Claims. (Cl. 33—172)

My invention relates to the class of devices which are employed more specifically for verifying the correctness of the intervals between surfaces or points, and an object of my invention, among others, is the production of a gage of the type just mentioned of simple construction and of extreme durability that may be employed for establishing the accuracy of the intervals in a certain and definite manner and to an amplified degree.

One form of a gage embodying my invention and in the construction and use of which the objects herein set out, as well as others, may be attained is illustrated in the accompanying drawings, in which—

Figure 1 is a view in vertical section through a gage embodying my invention.

Figure 2 is a similar view but illustrating some of the interior parts in full.

Figure 3 is a top plan view of the gage.

Figure 4 is a view partially in vertical section illustrating my improved gage used in connection with a secondary amplifying device.

Figure 5 is a view similar to Fig. 2 but illustrating a modification.

Figure 6 is a top plan view of the device as shown in Fig. 5.

My invention relates to an amplifying mechanism in which amplification is accurate and theoretically constant to its predetermined amplification ratio through its entire movement, and while this may be applied to many tools, instruments, mechanisms, etc. where amplification is required, for the purpose of specifically illustrating and describing the invention mention is made of a gage used in the manufacture of interchangeable parts and known in the art as limit flush pin gages.

These gages are well known in the art of production and are used for verifying or checking the distance of one surface in relation to another.

These flush pin gages consist of a body which contains a sliding member known as a flush pin and which extends from the bottom surface of the body a distance equal to that to be checked from one surface to another. A step is formed on the top surface of the body of a distance equal to the allowable variation permissible in the relation of two surfaces on the work piece relative to each other. The top surface of the flush pin is flush, that is, in the same plane with the top surface of the step on the body when the distance between the two surfaces on the work piece is at a minimum, and the top surface of the flush pin is flush or in the same plane with the lower step surface when the distance between the two surfaces to be checked is at a maximum.

In the use of these gages the top surface of the flush pin in relation to the high and low step surfaces is located by touch, that is, by moving a finger or finger nail over these surfaces. This procedure is sensitive and will easily detect the position of the top surface of the flush pin in relation to the high and low step surfaces. As long as the top surface of the flush pin is in the same plane with either step surfaces, or in between these surfaces, the distance between the surfaces on the work to be checked is correct and within the specified limits of tolerance.

Obviously the efficiency and usefulness of this type of limit flush pin gage is limited to checking intervals where the tolerance is sufficient to permit a step on the body which can be detected by touch. The minimum limit which can be checked efficiently with this type of gage is generally conceded to be about plus or minus .001, this making the step on the body equal to .002. Any measurements inside of these limits and less than plus or minus .001 are for practical purpose amplified by the additional use of other instruments such as dial indicators. This combination, known as indicator flush pin gage, is common in the art and well known to those skilled in the use of gages of this type and for which reason a detailed description of its manner of use will not be required.

To extend the usefulness of the step type flush pin gage and reduce the necessity for the addition of other amplifying instruments as described hereinbefore, I have conceived an amplifying means which will extend the scope or range of the step type flush pin gage and yet maintain the general principle of the method for determining dimensional tolerances.

The same amplifying means, but in a slightly modified form in combination with the instrument used on the indicator type flush pin gage will amplify the indicator means on the instrument, thereby making this instrument responsive to a greater degree to minute dimensional variations.

The amplifying means is fully enclosed in the body of the gage and well protected from injury and foreign matter, the ratio of amplification is constant throughout its entire movement and an adjusting means is provided to maintain accurate setting of the gage at any point within its range.

The construction of the amplifying means is simple and sturdy with substantial and durable contact areas on the functional surfaces of its component parts to withstand hard usage and can be produced with precision economically.

Such embodiment of the general principle of the amplifying means and the maintenance of the methods of checking dimensional tolerances with the well known types of flushpin gages as described hereinbefore is illustrated in the accompanying drawings in which the numeral 8 denotes the body or stock of my improved gage which is mounted upon and rigidly secured to a base 9, the latter having a guard 10 extending from the bottom as a protection for the primary plug 11 which is longitudinally slidable in an opening 12 extending in the direction of depth through the body or stock 8. The lower end of the primary plug may be constituted in the form of an exchangeable plug extension 13.

A guide pin 14 locked in body 8 and protruding partially into opening 12 extends across a flat surface 50 in a recess on the periphery of the primary plug 11, to serve as a guide to prevent radial dislocation of the primary plug 11. A limiting screw 15 extending through the body 8 and having a conical point on one end for engagement in a conical recess 31 in the primary plug 11 serves as a means to limit the endwise movement of the primary plug 11. An additional screw 41 is employed to lock adjusting screw 15 when in the desired position.

An opening 16 closed by a plate 17 extends into the body from one side thereof into the opening 12 and an amplifying plug 18 is inserted for sliding movement in said opening 16. The inner end of this amplifying plug is of tapered shape comprising two angular surfaces 19—20 diverging from the axial center of the plug 18. As shown in Fig. 1, an adjusting plug 21 is located for adjusting means in a hole extending lengthwise within the plug 18, the end of said adjusting plug having an angular contact surface 48. An adjusting screw 22 split at its threaded end, having its branches pressed a slight distance apart for frictional purpose, is engaged with a threaded hole extending from the outer end of the adjusting plug inwardly, the outer end of said screw being accessible when the plate 17 is removed for the reception of a tool for adjusting purposes. One end of a plunger 23 is seated upon a spring 46 in a blind hole extending inwardly from the end of the amplifying plug 18 the opposite end of the plunger being seated against the inner surface of plate 17 thereby holding the spring 46 under compression to create a force to move the amplifying plug 18 inwardly.

The angular surface 20 on the inner end of the amplifying plug 18 is engaged with a similarly formed angular mating surface 24 in the side of the primary plug 11, and the angular end surface 48 of the adjusting plug 21 engages with the angular end surface 42 on the secondary plug 25 located in the primary plug 11 and extending to the end thereof as shown in Figs. 1 and 2. Contact between these mating contact surfaces is maintained by the inward force of the spring 46 acting upon the amplifying plug 18.

The secondary plug 25 is forced inwardly into contact with the angularly shaped end 48 of the adjusting plug 21 by means of a spring 26 seated in the bottom of a hole extending inwardly from the end of said plug, the opposite end of the spring being seated against a pin extending through a slot in the side of the plug and with its opposite ends extended into holes in the wall of the hole in the primary plug 11 in which said plug 25 is located.

A step is provided on the outer end of the primary plug 11 as shown in Figs. 1, 2 and 3, the top surface 43 being the higher level of the step and the lower surface 30 being the lower level of the step. The distance between the high step surface 43 and the low step surface 30 is equal to the amplified dimensional tolerance to be obtained.

A plate 28 as shown in Figs. 1 and 2 is secured to the top surface of the body or stock 8. The raised portion of this plate contains a high step surface 27 and a low step surface 29. The distance between the high step surface 27 and low step surface 29 is equal to the actual or true tolerance to be obtained.

It will be noted that while my improved gage described and shown herein embodies the features of the old type flushpin gage so far as the mode of checking is concerned the measurements are obtained in amplified form and actual or true form, the operation being as follows:

The gage being placed upon a surface as denoted by the dotted line $a$ on which measurement is to be obtained within a specified tolerance in relation to the surface denoted by the dotted line $b$, the lower tip end 49 of the extension plug 13 upon contacting the surface denoted by the dotted line $b$ will be raised if the measurements to be obtained are within the proper bounds. The beveled surface 24 on the primary plug 11 contacting with the beveled surface 20 will push the amplifying plug 18 backwardly, and the secondary plug 25 whose beveled end surface 42 is contacting and pressing against the beveled end surface 48 on the adjusting plug 21 will move proportionately downward. If the upward movement of the primary plug 11 and the proporpionate downward movement of the secondary plug 25 is of such dimension that the lower step surface 30 on the upper end of the primary plug 11 and the end surface 44 on the secondary plug 25 are flush or in the same plane as shown in Fig. 1 the distance between the surface $a$ and $b$ is within the minimum limit of tolerance permitted. Fig. 2 shows the end surface 44 of the secondary plug 25 flush or in the same plane with the high step surface 43 on the end of the primary plug 11 which indicates that the distance from surface $a$ to $b$ is within the maximum permissible limit of tolerance. In this instance the primary plug 11 did not move upwardly to the same extent as before. The action of the primary plug 11, the amplifying plug 18 and the secondary plug 25 was the same in this case as described before but the outward movement of the amplifying plug 18 and the downward movement of the secondary plug 25 was less and proportionate to the movement of the primary plug 11.

As described before the distance between the low step surface 30 and the high step surface 43 on the primary plug 11 is equal to the permissible tolerance on the distance to be checked in amplified form and as long as the end surface 44 of the secondary plug 25 is flush or in between these two step surfaces, the distance from the surface $a$ to $b$ is within the specified limit of tolerance.

Referring again to Fig. 1, the lower step surface 30 on the primary plug 11 and the end surface 44 of the secondary plug 25 are flush or in the same plane, the higher step surface 43 on the primary plug 11 is also flush or in the same plane with the high step surface 27 on the top plate 28. In this position the distance from the surface denoted by the dotted line a to the surface denoted by the dotted line b is within the minimum permissible limit of tolerance to be checked. As shown in Fig. 2 the high step surface 43 on the primary plug 11 is flush or in the same plane with the end surface 44 on the secondary plug 25, the high step surface 43 on the primary plug 11 is also flush or in the same plane with the lower step surface 29 in the top plate 28. In this position the distance from the surface denoted by the dotted line a to the surface denoted by the dotted line b is within the maximum permissible limit of the tolerance to be checked. The distance between the high step surface 27 and the low step surface 29 on the top plate 28 is equal to the actual or true permissible tolerance and as long as the high step surface 43 on the primary plug 11 is flush with either step surface or registers in between these two surfaces the dimension to be checked is within the tolerance specified.

I want to state again that this gage can be used to check the permissible tolerance in amplified form or in combination to check both the amplified and the actual or true form of the specified tolerance.

By changing the position of the conical point on the limiting screw 15 in the body 8 in relation to the conical recess 31 in the primary plug 11, that is, by moving the limiting screw 15 either in or out, the movement of the primary plug 11 can be adjusted to a minimum of travel necessary and thereby increase the life of accuracy on all sliding surfaces subject to wear.

As hereinbefore related the angular contact surface 48 on the adjustment plug 21 contacts the angular contact surface 42 on the inner end of the secondary plug 25 and the adjusting screw 22 in the adjustment plug 21 is for the purpose of adjusting the gage to its original correct setting when the contact surface 49 on the primary plug extension 13 is worn or to provide a means to set the gage within the range of the gage capacity without changing the position of or exchanging the plug extension 13. To repeat, when the end surface 49 of the plug extension 13 extends from the lower surface 45 of the base 9 equal to the maximum dimension to be gaged the top surface 44 of the secondary plunger 25 will be in the same plane with the top step surface 43 on the end of the primary plunger 11. When the end surface 49 of the plunger extension 13 extends a distance equal to the minimum dimension to be gaged the top surface 44 of the secondary plunger 25 will be in the same plane as the lower step surface 30 on the end of the primary plunger 11. It is evident that in order to set the gage it will only be necessary to extend the plunger extension 13 from the rest surface 45 of the base 9 either a distance equal to the minimum or maximum distance to be gaged and then adjust the secondary plug 25 by means of the adjusting plug 21 until the top surface 44 of the secondary plug 25 is in the same plane with either the lower or higher step surface, respectively, on the upper end of the plunger 11.

Obviously the spring 46 upon which the plunger 23 is seated is stronger then the actuating spring 26 which holds the secondary plug 25 in contact with the adjustment plug 21 so that the action of the latter to force the plug 25 outwardly will not be prevented.

By changing the angular relationship of the contact surface 24 in the recess of the primary plug 11 and the corresponding contact surface 20 on the amplifying plug 18 many variations of relative degree of movement can be obtained on the amplifying plug 18 which is in turn transmitted by the adjusting plug 21 to the secondary plug 25. A further variation of movement of the secondary plug 25 is obtained by changing the angular relationship of the contact surface 42 on the secondary plug 25 and the corresponding contact surface 48 on the adjusting plug 21, the degree of such relative movements being readily obtained by simple mathematical calculations. The angular positions of the contact surfaces just mentioned, and with reference to Figs. 1 and 2, are limited to a dimensional degree where the upward movement of the primary plug 11 will not cause the automatic outward movement of the amplifying plug 18, or the spring force of the spring 46 acting upon the amplifying plug 18 will not cause the adjusting plug 21 in contact with the angular surface 42 on the secondary plug 25 to move the latter plug automatically outward.

The drawing in Fig. 5 shows the angular relationship of the angular contact surface 24 in the recess of the primary plug 11 with the contact surface 20 on the amplifying plug 18 in conformity with the explanation just mentioned, more specifically, the angular position of the angular contact surface 24 in the recess of the primary plug 11 is of such dimensional degree that the upward force caused by the upward movement of the primary plug 11 and acting through the angular contact surface 24 upon the contact surface 20 on the amplifying plug 18 and normal to these surfaces, is substantially too far in the direction parallel to the longitudinal axis of the primary plug 11 and therefore will not move the amplifying plug 18 automatically outward. In this disposition of the angles the degree of movement of the secondary plug 25 relatively to the movement of the primary plug 11 will be materially increased. In order to move the amplifying plug 18 outwardly as shown in Fig. 5 the amplifying plug 18 is provided with a rack 32 which engages with a pinion 33 rotatably mounted in the body or stock 8, and a screw plug 35 is employed to hold pinion 33 in position. A spring loaded plunger 34 extending into the body or stock 8 has a rack 51 which is also engaged with the pinion 33 whereby pressing the spring loaded plunger 34 downwardly the pinion 33 is rotated and affects a backward movement of the amplifying plug 18 as shown in Figs. 5 and 6. With the amplifying plug 18 thus disengaged the primary plug 11 is free to move and find its gaging position on the work piece and upon the release of the downward pressure on the plunger 34 the spring 47 will force the plunger 34 upward and thereby moving the amplifying plug 18 inwardly until the angular surface 20 is in contact with the angular contact surface 24 in the recess of the primary plug 11. Except for the above described modification of operation with reference to Figs. 1 and 2 the function of the amplifying means and the mode of checking is the same, but the amplifying ratio has been increased.

In Fig. 4 of the drawings I have illustrated the manner in which further amplification of the movements of the primary plug 11 may be obtained by the addition of a dial indicator gage 36 which is common in the art and well known to those skilled in the use of gages of this type and for which reason a detailed description of its manner of use will not be required. In making provision for this gage the end of the primary plug 11 is socketed and provided with a slot 37 and a screw 38 for closing the slot and thereby binding the stem 39 of the indicator to secure the latter in place. The plunger 40 of the indicator 36 is thus positioned against the end of the secondary plunger 25 and any combined movement of the secondary plunger 25 in either direction and the movement of the primary plug 11 in the opposite direction will again be amplified with the dial indicator 36, the body of the indicator being held on the stem 39 by the primary plug 11 following the movement of this plug in one direction and the indicator plunger 40 being in contact with the secondary plug 25 following the movement of this plug in the opposite direction. This combination of amplification ratios, one amplification ratio embodied in my new gage and the other embodied in the dial indicator 36 will make the indicator 36 responsive to a greater degree to very small movements of the primary plug 11 and will cause a substantial movement of the indicator pointer. The position of the indicator pointer in relation to the graduation on the indicator dial is readily located by visual inspection. The addition of an amplifying instrument makes this gage very effective and useful when the amplified step as shown in Figs. 1, 2 and 6 is too small to be checked by touch.

It will be noted that the amplifying plug 18 does not contain the adjustment plug 21 as shown in Figs. 1, 2 and 3 and described hereinbefore. The angular surface 19 on the amplifying plug 18 contacts the angular surface 42 of the secondary plug 25 directly and the function of the adjustment plug 21 is substituted by the dial on the indicator 36 which can be rotatably moved to bring the graduation line on the indicator dial denoted by "Zero" to coincide with the position of the indicator pointer, when the end surface 49 on the primary plug 11 extends from the lower surface 45 of the base 9 equal to the basic distance to be gaged.

The foregoing description is directed solely towards the construction illustrated, but I desire it to be understood that I reserve the privilege of resorting to all mechanical changes to which the device is susceptible, the invention being defined and limited only by the terms of the appending claims.

I claim:

1. A gage for determining dimensional values comprising a body having a base surface, a primary plunger carried by said body and movable in a rectilinear path, one end of said plunger being adapted to contact a work surface spaced from said base surface, a secondary plunger carried by said body and movable in a rectilinear path parallel to the path of movement of said primary plunger, surfaces on each of said plungers inclined to the path of movement of said plungers, a corresponding end of each of said plungers terminating adjacent a surface of said body, indicating surfaces on said plungers adjacent said end, an indicating surface on said body adjacent the indicating surfaces on said primary and secondary plungers, and a third plunger carried by said body and movable in a rectilinear path transversely of the path of movement of said other plungers, said third plunger having a pair of inclined surfaces cooperating with and complementary to the respective inclined surfaces of said primary and secondary plungers, means urging an inclined surface of said third plunger into engagement with the complementary inclined surface of said primary plunger, means urging the inclined surface of the secondary plunger into engagement with the complementary inclined surface of the third plunger, said secondary plunger being arranged to be displaced relative to movement of said primary plunger but in opposite direction whereby the dimensional movement of said primary plunger with respect to the base surface of said body is indicated in actual degree by the relative displacement of the indicating surfaces on said primary plunger and said body and indicated to amplified dimensional degrees by the relative displacement of the indicating surface on said secondary plunger with respect to the indicating surfaces on said primary plunger and said body.

2. A gage for indicating dimensional values comprising a body having a base surface, a primary member carried by said body and movable in a rectilinear path, means operatively associated with said member for contacting a work surface spaced from said base surface, a secondary member carried by said body and movable in a rectilinear path, a third member carried by said body and movable in a rectilinear path transversely of the paths of movement of said primary and secondary members, a surface on said primary member, a surface on said third member contacting the surface on said primary member, one of said surfaces being inclined to the path of movement of said primary member, a surface on said secondary member, a second surface on said third member contacting the surface on said secondary member, one of said last two mentioned surfaces being inclined to the path of movement of said secondary member whereby movement of said primary member along its path of travel requires movement of said third member along its path of travel to maintain contact between said primary and third members and said movement of said third member requires movement of said secondary member along its path of travel to maintain said secondary and third members in contact, said primary and secondary members being positioned such that their paths of movement are generally parallel whereby when said work surface engaging means on said primary member are brought into contact with a work surface the relative movement of said primary and secondary members while in contact with said third member indicates the position of the work surface relative to said base surface.

3. The combination set forth in claim 2 wherein said primary and secondary members are positioned such that their paths of travel are parallel, said inclined surfaces being oppositely inclined such that when said primary member is moved in one direction and contact is maintained between said primary and third member and between said third member and said secondary member, said secondary member moves in a direction opposite to the direction of movement of said primary member.

4. The combination set forth in claim 2 wherein said inclined surfaces are oppositely inclined and said primary and secondary members are adjacently positioned.

5. The combination set forth in claim 4 wherein said oppositely inclined surfaces form an acute included angle, said primary and secondary members being positioned such that their paths of movement are parallel whereby said primary and secondary members move in opposite directions to maintain contact with said third members when said third member is moved along its path of travel.

6. The combination set forth in claim 2 including means on said primary and secondary members for indicating the positions thereof relative to each other.

7. The combination set forth in claim 2 wherein said primary, secondary, and third members comprise plungers slidable axially on said body.

8. The combination set forth in claim 7 wherein said primary plunger is provided with a bore, said secondary plunger being slidable within the bore of said primary plunger.

9. The combination set forth in claim 7 wherein said primary and secondary plungers have adjacently disposed end surfaces, said inclined surfaces being oppositely inclined such that said primary and secondary plungers move in opposite directions to maintain contact with said third plunger when said third plunger is moved along its path of travel whereby the relative movement of said primary and secondary plungers is indicated by the displacement of said end surfaces.

10. A gage for indicating dimensional values comprising a body having a base surface, a primary plunger carried by said body and movable in a rectilinear path, one end of said plunger projecting outwardly beyond said base surface for contacting a work surface spaced from said base surface, a secondary plunger carried by said body and movable in a rectilinear path parallel to the path of movement of said primary plunger, a surface on each of said plungers inclined to the path of movement of said plungers, a third plunger carried by said body and movable in a rectilinear path transversely of the paths of movement of said primary and secondary plungers, said third plunger having a pair of oppositely inclined surfaces adapted to slidably contact respectively the inclined surfaces on said primary and secondary plungers whereby movement of said primary plunger along its path of travel requires movement of said third plunger along its path of travel to maintain contact between the inclined surfaces of said primary and third plungers, said movement of said third plunger requiring movement of said secondary plunger along its path of travel and in a direction opposite to the movement of said primary plunger to maintain contact between the inclined surfaces of said secondary and third plungers, said primary and secondary plungers having means thereon for indicating the relative positions of said primary and secondary plungers.

11. The combination set forth in claim 10 wherein said last mentioned means comprise adjacently disposed end surfaces on said primary and secondary plungers whereby the actual movement of said primary plunger is indicated to an amplified dimensional degree by the displacement of said end surfaces.

12. The combination set forth in claim 2 including means for adjusting one of said inclined surfaces in a direction axially of the member having said inclined surface.

13. The combination set forth in claim 2 wherein said inclined surfaces are carried by said third member and including means for adjusting one of said inclined surfaces in a direction axially of said third member whereby the relative positions of said primary and secondary members may be adjusted for a fixed position of said third member.

14. The combination set forth in claim 10 including means for adjusting one of the oppositely inclined surfaces on said third member in a direction axially of said third member.

HANS J. LOVENSTON.

REFERENCES CITED

The following references are of record in the file of this patent:

UNITED STATES PATENTS

| Number | Name | Date |
|---|---|---|
| 1,314,888 | Mitchell | Sept. 2, 1919 |
| 1,655,133 | Clase | July 3, 1928 |
| 2,324,998 | Dague | July 20, 1943 |
| 2,339,699 | Husband | Jan. 18, 1944 |
| 2,363,165 | Vierling | Nov. 21, 1944 |